No. 684,810. Patented Oct. 22, 1901.
E. W. GOODENOUGH.
MEANS FOR LOCKING NUTS, BOLTS, OR THE LIKE.
(Application filed Aug. 18, 1900.)
(No Model.)
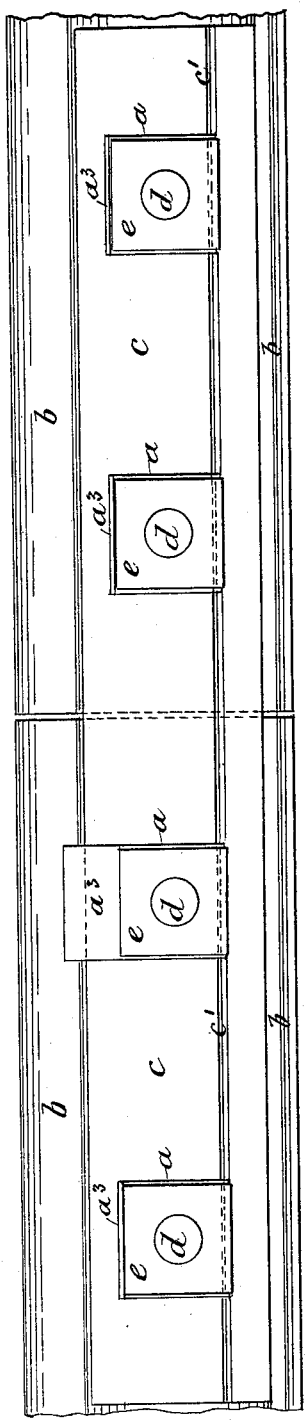
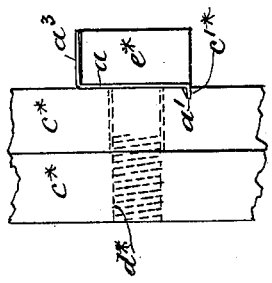
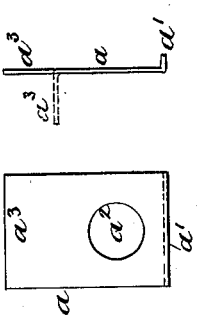
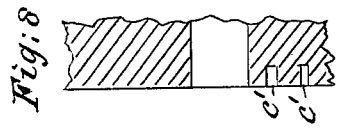
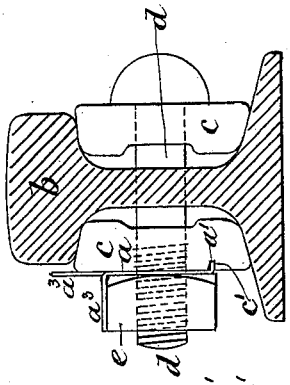
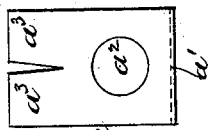

UNITED STATES PATENT OFFICE.

EDWARD W. GOODENOUGH, OF LONDON, ENGLAND.

MEANS FOR LOCKING NUTS, BOLTS, OR THE LIKE.

SPECIFICATION forming part of Letters Patent No. 684,810, dated October 22, 1901.

Application filed August 18, 1900. Serial No. 27,304. (No model.)

*To all whom it may concern:*

Be it known that I, EDWARD WILLIAM GOODENOUGH, a subject of the Queen of Great Britain, residing at London, England, have invented certain new and useful Improvements in Means for Locking Nuts, Bolts, or the Like, of which the following is a full, clear, and exact description, and for which I have made application for patent in Great Britain, dated January 24, 1900.

My improvement relates to that construction of locking means for nuts and bolts, screws, and the like having flat-sided heads in which a washer is employed having an inturned flange adapted to engage in a groove of a plate and an extension adapted to be turned outward against a flat side of a nut or head.

The object of my invention is to provide means whereby the inturned flange may be prevented from springing out or leaving its groove or working therein and at the same time be well protected, so as to avoid the entrance of moisture into the groove and around the flange, which causes rusting and disintegration of the flange or the wearing of the groove and the flange by the vibration of the latter in the former when the flange is not covered and firmly seated in its groove, thus destroying the lock between the washer and the plate with which it is associated.

Another object of my invention is to so form one end of the washer as to provide an inner inturned double flange and an inturned outer flange adapted to engage in parallel grooves of a plate.

My invention is illustrated in the accompanying drawings, in which—

Figure 1 is an elevation of a rail-joint, and Fig. 2 is a section of a rail having the nuts locked in accordance therewith. Fig. 3 is a plan, and Fig. 4 is a side view, of a washer forming part of the invention. Fig. 5 shows the invention applied to bolts or screws having flat-sided heads similar to nuts. Figs. 6 and 7 show modifications in the form of the washer, and Fig. 8 shows a section of a plate suitable for use with the washer shown at Fig. 6.

In carrying my invention into effect I form a washer $a$ of rectangular shape having an inturned flange $a'$ at one end thereof. The hole $a^2$ in said washer, through which the bolt or screw passes, is formed near to that end of the washer upon which the inturned flange $a'$ is formed, thus leaving a locking portion or extension $a^3$, which may be turned outward into contact with one side of the nut or bolt-head when this latter is screwed up tightly.

In Figs. 1 and 2 I have shown the invention applied to the nuts and bolts used with fish-plates for connecting the ends of rails. $b\ b$ are the rails. $c\ c$ are the fish-plates. $d\ d$ are the bolts, and $e\ e$ are the nuts. One of the fish-plates $c$ is formed with a continuous groove $c'$ near to the bolt-holes to receive the inturned flanges $a'$ of the washers $a$, thus enabling the groove to be formed simultaneously with the rolling of the fish-plate. The nuts $e$ are sufficiently large to cover the inturned flanges $a'$ when screwed in position. They thus hold the inturned flanges $a'$ firmly in the groove $c'$ and prevent them from springing out or leaving the groove or vibrating in the latter to their destruction and at the same time keeping out moisture, and thus avoiding rapid rusting, while the inturned flanges provide a stronger lock to hold the washers $a$ from turning on the bolts $d$. When the nuts $e$ are screwed up tightly, the locking portion or extension $a^3$ of each washer $a$ is turned outward into close contact with one side of its nut $e$, and thus the nut is locked. In Figs. 1 and 2 three of the nuts are shown locked and the remaining one is ready to have the locking portion or extension $a^3$ turned outward into contact with one side of its nut.

In Fig. 5 I have shown the invention applied to the head of a bolt or screw. $c^*\ c^*$ are two plates of metal connected together by means of a bolt or screw $d^*$, having a flat-sided head $e^*$. One of these plates $c^*$ has a flange-groove $c'^*$ formed therein to receive the flange $a'$ of the washer $a$. When the bolt or screw is in position, with one side located over the inturned flange $a'$, the locking portion or extension $a^3$ of the washer $a$ is turned outward into contact with one of the flat sides of the head $e^*$, which latter is thus firmly locked.

In some cases the washers $a$ may be formed at one end with more than one flange. Such a washer is shown at Fig. 6 having two parallel inturned flanges $a'$ to fit into two parallel grooves $c'$, as shown in Fig. 8. The inner inturned flange is double and is produced in the manufacture of a washer by a fold, as shown in Fig. 7. When it is desired to turn up the locking part of the washer into contact with more than one face of the nut, the locking part is preferably split, as shown in Fig. 7.

What I claim as my invention, and desire to secure by Letters Patent, is—

1. A locking means comprising an article having a groove formed in the surface thereof, a rectangular washer formed with an inturned flange at one end thereof fitting in the groove, a bolt-opening contiguous to the inturned flange, and an extension, at the other end of the washer, adapted to be turned outward parallel with the flange, and a bolt extending through the bolt-hole and having a nut or head formed with flat sides and located over the inturned flange so as to cover and protect the latter and prevent it from springing out or working in the groove to its destruction.

2. A locking means comprising an article having parallel grooves, a washer having an inner inturned double flange, and an inturned outer flange engaging in their respective grooves, a bolt-opening adjacent to the double flange and an extension adapted to be turned outward and a bolt extending through the bolt-hole and having a nut or head formed with flat sides and located over the double flange so as to cover and protect the latter and prevent it from springing out or working in its groove.

In testimony whereof I affix my signature in presence of two witnesses.

E. W. GOODENOUGH.

Witnesses:
E. A. GOODENOUGH,
CLAUDE K. MILLS.